(12) United States Patent
Chiba et al.

(10) Patent No.: US 12,609,028 B2
(45) Date of Patent: Apr. 21, 2026

(54) MOVING BODY SUPPORT SYSTEM AND MOVING BODY SUPPORT METHOD

(71) Applicant: TOYOTA JIDOSHA KABUSHIKI KAISHA, Toyota (JP)

(72) Inventors: Hiroya Chiba, Fuji (JP); Tatsuya Sugano, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 626 days.

(21) Appl. No.: 18/105,049

(22) Filed: Feb. 2, 2023

(65) Prior Publication Data

US 2023/0316915 A1 Oct. 5, 2023

(30) Foreign Application Priority Data

Mar. 29, 2022 (JP) ................................. 2022-054423

(51) Int. Cl.
*G08G 1/14* (2006.01)
*G06T 7/60* (2017.01)
(Continued)

(52) U.S. Cl.
CPC .............. *G08G 1/143* (2013.01); *G06T 7/60* (2013.01); *G06T 7/73* (2017.01); *G06V 10/60* (2022.01);
(Continued)

(58) Field of Classification Search
CPC .. G08G 1/143; G06T 7/73; G06T 7/60; G06T 2207/30204; G06T 2207/30261; G06T 2207/30264; G06V 20/58; G06V 10/60; G06V 10/993; G06V 2201/08; H04N 23/76; H04N 23/71
See application file for complete search history.

(56) References Cited

U.S. PATENT DOCUMENTS 11,117,570 B1 * 9/2021 Broggi ................. G06V 20/586
2012/0268602 A1 * 10/2012 Hirai ....................... G06T 7/136
348/148

(Continued)

FOREIGN PATENT DOCUMENTS

JP 2010-215029 A 9/2010
JP 2011065442 A * 3/2011
(Continued)

*Primary Examiner* — John Villecco
*Assistant Examiner* — Alexander John Rodgers
(74) *Attorney, Agent, or Firm* — Dinsmore & Shohl LLP

(57) ABSTRACT

A moving body support system supports a moving body that recognizes a marker arranged in a predetermined area. The moving body support system estimates brightness at a position of the marker in the predetermined area without using an image captured by a camera mounted on the moving body. The moving body support system calculates a luminance correction value of an image including the marker according to the brightness at the position of the marker. The moving body support system acquires a first image including a target marker around the moving body by using the camera. The moving body support system generates a second image by correcting luminance of the first image by using the luminance correction value for the target marker. Then, the moving body support system recognizes the target marker based on the second image.

15 Claims, 17 Drawing Sheets

(51) Int. Cl.

| | |
|---|---|
| *G06T 7/73* | (2017.01) |
| *G06V 10/60* | (2022.01) |
| *G06V 10/98* | (2022.01) |
| *G06V 20/58* | (2022.01) |
| *H04N 23/71* | (2023.01) |
| *H04N 23/76* | (2023.01) |

(52) U.S. Cl.

CPC ............ *G06V 10/993* (2022.01); *G06V 20/58* (2022.01); *H04N 23/71* (2023.01); *H04N 23/76* (2023.01); *G06T 2207/30204* (2013.01); *G06T 2207/30261* (2013.01); *G06T 2207/30264* (2013.01); *G06V 2201/08* (2022.01)

(56) References Cited

U.S. PATENT DOCUMENTS

| | | | | |
|---|---|---|---|---|
| 2018/0003493 | A1* | 1/2018 | Bernhard | G01C 5/00 |
| 2019/0219662 | A1* | 7/2019 | Siessegger | G01C 21/206 |
| 2019/0295281 | A1* | 9/2019 | Yamada | G06V 20/58 |
| 2019/0347966 | A1* | 11/2019 | Lee | G09F 9/305 |
| 2020/0031395 | A1* | 1/2020 | Matsunaga | B62D 15/0285 |
| 2020/0207270 | A1* | 7/2020 | Iida | H04N 23/76 |
| 2020/0234451 | A1* | 7/2020 | Holzer | G06T 7/194 |
| 2020/0284883 | A1* | 9/2020 | Ferreira | G01S 7/4815 |
| 2021/0142671 | A1* | 5/2021 | Takato | G08G 1/065 |
| 2021/0233404 | A1 | 7/2021 | Matsuhana et al. | |
| 2022/0259914 | A1* | 8/2022 | Tsukao | E05F 15/73 |
| 2022/0277163 | A1* | 9/2022 | Stenneth | G06T 7/12 |
| 2022/0410881 | A1* | 12/2022 | Young | B60W 30/095 |
| 2023/0129091 | A1* | 4/2023 | Bajsarowicz | G01C 21/20 701/25 |
| 2023/0258467 | A1* | 8/2023 | Chiba | G01C 21/3602 701/24 |

FOREIGN PATENT DOCUMENTS

| | | | | |
|---|---|---|---|---|
| JP | 2016-194815 | A | | 11/2016 |
| JP | 2017220876 | A | * | 12/2017 |
| JP | 2018-039293 | A | | 3/2018 |
| JP | 2019-098911 | A | | 6/2019 |
| JP | 2021-117726 | A | | 8/2021 |

* cited by examiner

23

Communication device

26

Processor

27

Storage device

710

Map information

720

Vehicle position information

730

Brightness estimation information

740

Brightness information

Management apparatus 2

Moving body support system

| | | Daytime | | Nighttime |
| --- | --- | --- | --- | --- |
| | Fine weather after rain | Fine weather | Sunshine | Cloudy | — |
| There is a shadow | 0.3 | 0.5 | 1.0 | 1.2 | 1.5 |
| There is no shadow | 0.5 | 0.8 | 1.2 | 1.5 | 2.0 |

MOVING BODY SUPPORT SYSTEM AND MOVING BODY SUPPORT METHOD

CROSS-REFERENCE TO RELATED APPLICATION

This application claims priority to Japanese Patent Application No. 2022-054423 filed on Mar. 29, 2022, the entire contents of which are incorporated by reference herein.

BACKGROUND

Technical Field

The present disclosure relates to a technique for supporting a moving body that operates by recognizing a marker arranged in a predetermined area.

Background Art

Patent Literature 1 relates to a parking assist technique for identifying a relative positional relationship between a vehicle and a target parking position by recognizing a mark and calculating a parking trajectory for guiding the vehicle to the target parking position. The mark is installed at the target parking position and recognized by an image captured by a video camera mounted on the vehicle. In the parking assist technique disclosed in the Patent Literature 1, a photometric area is set in the image, a luminance value of the image is adjusted based on the luminance value of the photometric area, and then the mark is recognized from the image.

LIST OF RELATED ART

Patent Literature 1: Japanese Laid-Open Patent Application No. JP-2010-215029

SUMMARY

A moving body that recognizes a marker installed in a predetermined area is considered. The moving body recognizes the marker by capturing an image using a camera. A brightness at a position of the marker changes due to a change of an environment such as weather, an hour, presence or absence of a street lamp, and the like. Further, the brightness at the position of the marker also changes when a shadow falls on the marker. When the brightness at the position of the marker changes, it may be difficult for the moving body to recognize the marker. When the moving body cannot recognize the marker with high accuracy, for example, accuracy of an operation of the moving body based on a result of marker recognition decreases.

An object of the present disclosure is to provide a technique capable of improving the accuracy of marker recognition by a moving body.

A first aspect relates to a moving body support system for supporting a moving body that recognizes a marker arranged in a predetermined area.

The moving body support system comprises one or more processors.

The one or more processors are configured to execute:

a brightness estimation process that estimates brightness at a position of the marker in the predetermined area without using an image captured by a camera mounted on the moving body;

a process that calculates a luminance correction value of an image including the marker according to the brightness at the position of the marker;

a process that acquires a first image including a target marker around the moving body by using the camera;

a process that generates a second image by correcting luminance of the first image by using the luminance correction value for the target marker; and a process that recognizes the target marker based on the second image.

A second aspect relates to a moving body support method for supporting a moving body that recognizes a marker arranged in a predetermined area.

The moving body support method comprises:

estimating brightness at a position of the marker in the predetermined area without using an image captured by a camera mounted on the moving body;

calculating a luminance correction value of an image including the marker according to the brightness at the position of the marker;

acquiring a first image including a target marker around the moving body by using the camera;

generating a second image by correcting luminance of the first image by using the luminance correction value for the target marker; and recognizing the target marker based on the second image.

According to the present disclosure, the luminance correction value for correcting the captured image is calculated in accordance with the brightness at the position of the marker. As a result of correcting the image by using the luminance correction value, accuracy of the marker recognition by the moving body is improved.

BRIEF DESCRIPTION OF DRAWINGS

FIG. 16 is a table for explaining an example of a luminance correction value according to the present embodiment.

EMBODIMENTS

Embodiments of the present disclosure will be described with reference to the accompanying drawings.

1. Overview

The present disclosure relates to a moving body support system for supporting a moving body that recognizes a marker arranged in a predetermined area. Support of the moving body means support for general aspects related to the moving body, and it includes monitoring the moving body, controlling the operation of the moving body, managing information related to the moving body, and the like. Examples of the predetermined area include a parking lot and a travelling area of a circulating bus. Examples of the moving body include a vehicle and a robot. The vehicle may be an autonomous driving vehicle. As an example, a case where the moving body is a vehicle will be considered in the following description. When generalizing, "vehicle" in the following description is replaced with "moving body".

Figure 1:
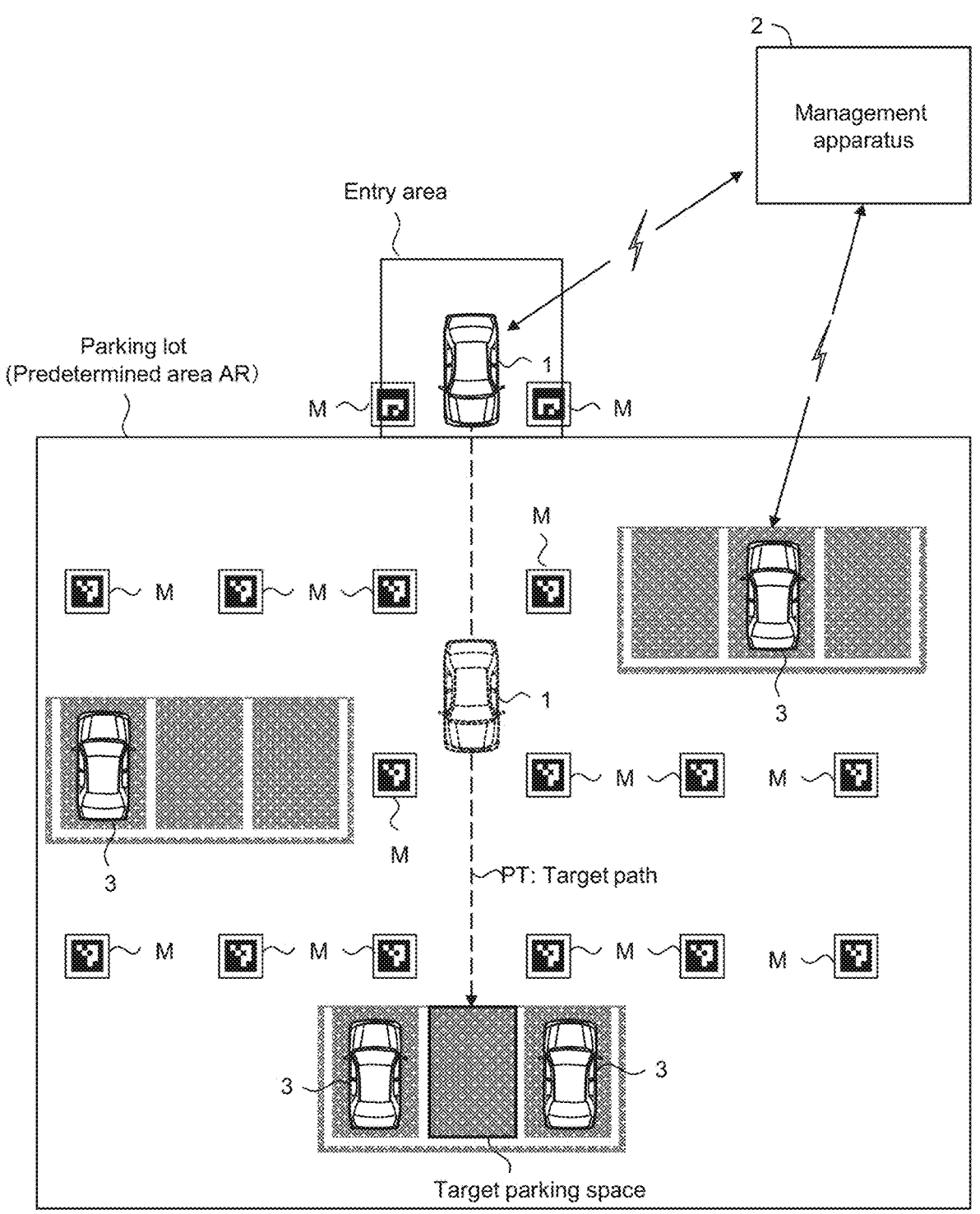
FIG. 1 is a conceptual diagram for explaining an overview of automated valet parking.

FIG. 1 is a conceptual diagram for explaining "automated valet parking (AVP)" as an example of a case where a vehicle 1 recognizes a marker M arranged in a predetermined area AR. In this example, the predetermined area AR is the parking lot. An entry area is an area in which the vehicle 1 starts and ends automated valet parking and is included in the predetermined area AR. The parking lot may be indoor or outdoor. A plurality of markers M are arranged in the parking lot.

The vehicle 1 is an AVP vehicle that supports the automated valet parking in the parking lot, and can automatically travel at least in the parking lot. The vehicle 1 is provided with a recognition sensor for recognizing a surrounding situation. The recognition sensor includes a camera. The vehicle 1 automatically travels in the parking lot while recognizing the surrounding situation using the recognition sensor.

The vehicle 1 uses a camera to acquire an image indicating a situation around the vehicle 1, and recognizes the marker M based on the acquired image. The vehicle 1 can, by recognizing the marker M, distinguish the parking lot, recognize an initial position at an entry time, correct a target path, detect a target parking position, estimate a self-position, and the like. For example, the vehicle 1 performs self-position estimation (localization) that estimates self-position with high accuracy by combining a result of recognition of the marker M based on the camera and position information of the marker M in the parking lot. Alternatively, the vehicle 1 may recognize the parking lot based on the result of recognition of the marker M and confirm that the vehicle 1 has entered the correct parking lot. Alternatively, the vehicle 1 may recognize the entry area based on the result of recognition of the marker M.

A target path PT is a path of movement for the vehicle 1 to move to a target parking space. The target parking space is a parking space assigned to the vehicle 1. The target path PT may be a path of movement from the entry area to the target parking space or may be a path of movement from a current position of the vehicle 1 to the target parking space. The vehicle 1 performs autonomous driving so as to follow the target path PT based on the position of the vehicle 1 estimated by the self-position estimation and the target path PT. Thus, the vehicle 1 can automatically move from the entry area to the target parking space.

A management apparatus 2 manages automated valet parking in the parking lot. The management apparatus 2 may be a server. The management apparatus 2 is capable of communicating with each vehicle (vehicle 1, parked vehicle 3) in the parking lot. For example, the management apparatus 2 may issue an entry instruction or an exit instruction to the vehicle 1. The management apparatus 2 may grasp the scheduled exit time of each vehicle (vehicle 1, parked vehicle 3) in the parking lot. When there is an AVP vehicle scheduled to enter the parking lot, the management apparatus 2 may grasp the scheduled entry time of the vehicle which is scheduled to enter the parking lot. The management apparatus 2 may provide the position information of the marker M in the parking lot to the vehicles 1. The management apparatus 2 may allocate the target parking space to the vehicle 1. The management apparatus 2 may generate the target path PT and provide information of the target path PT to the vehicle 1. The management apparatus 2 may grasp the position of each vehicle (vehicle 1, parked vehicle 3) in the parking lot. The management apparatus 2 may remotely operate each vehicle (vehicle 1, parked vehicle 3) in the parking lot.

In order for the vehicle 1 to operate correctly, it is important for the vehicle 1 to recognize the marker M correctly. However, when the brightness at the position of the marker M changes, the vehicle 1 may not be able to correctly recognize the marker M. For example, when the position of the marker M becomes bright, the luminance of the captured image becomes high, the image becomes overexposed, and the vehicle 1 may not be able to recognize the marker M. In another case, when the position of the marker M becomes dark, the luminance of the captured image becomes low, the image becomes blackish as a whole, and the vehicle 1 may not be able to recognize the marker M. As described above, because the luminance of the image changes due to change of brightness at the position of the marker M, there is a possibility that the accuracy of the recognition of the marker M decreases.

FIGS. 2 to 5 conceptually show states of the parking lot in the morning, in the daytime, in the evening, and at night, respectively. The brightness at the position of the marker changes depending on weather and an hour. When the sun rises in the daytime, the brightness at the position of the marker M becomes higher than that in the morning or in the evening. On the contrary, when the parking lot becomes dark at night, the brightness at the position of the marker M becomes dark. In another case, although not illustrated, the brightness at the position of the marker M may also become dark in rainy weather or in cloudy weather. As described above, when the surrounding environment changes, the brightness at the position of the marker M changes.

Further, the brightness at the position of the marker M also changes when a shadow falls on the marker M. For example, in FIGS. 2, 4, and 5, shadows created by the parked vehicles 3 or a wall in the parking lot fall on some of the markers M, and the brightness at the positions of the markers M become dark. The shadows falling on the markers M varies depending on the positions of light sources such as the sun or street lamps, or positions of obstacles such as the parked vehicles 3 or the wall.

As described above, accuracy of the marker recognition by the vehicle 1 may decrease due to the change in the surrounding environment or the position of shadows. The moving body support system according to the present embodiment makes it possible to improve the accuracy of the marker recognition by the vehicle 1 even in a situation where the brightness at the position of the marker M may change.

2. Brightness Estimation and Luminance Correction

In the following description, a "camera image" means the image around the vehicle 1 captured by the camera mounted on the vehicle 1. The moving body support system according to the present embodiment improves the accuracy of the marker recognition by correcting the luminance of the camera image. Specifically, the moving body support system acquires brightness information about the brightness at the position of the marker M. In some embodiments, the moving body support system acquires the brightness information at the position of the marker M without using the camera image captured by the camera mounted on the vehicle 1. The moving body support system calculates a "luminance correction value" for correcting the luminance of the camera image based on the brightness information. The luminance correction value is set so as to darken an excessively bright camera image or brighten an excessively dark camera image. Then, the luminance of the camera image is corrected by the luminance correction value, and the marker M is recognized based on the corrected image.

Figure 6:
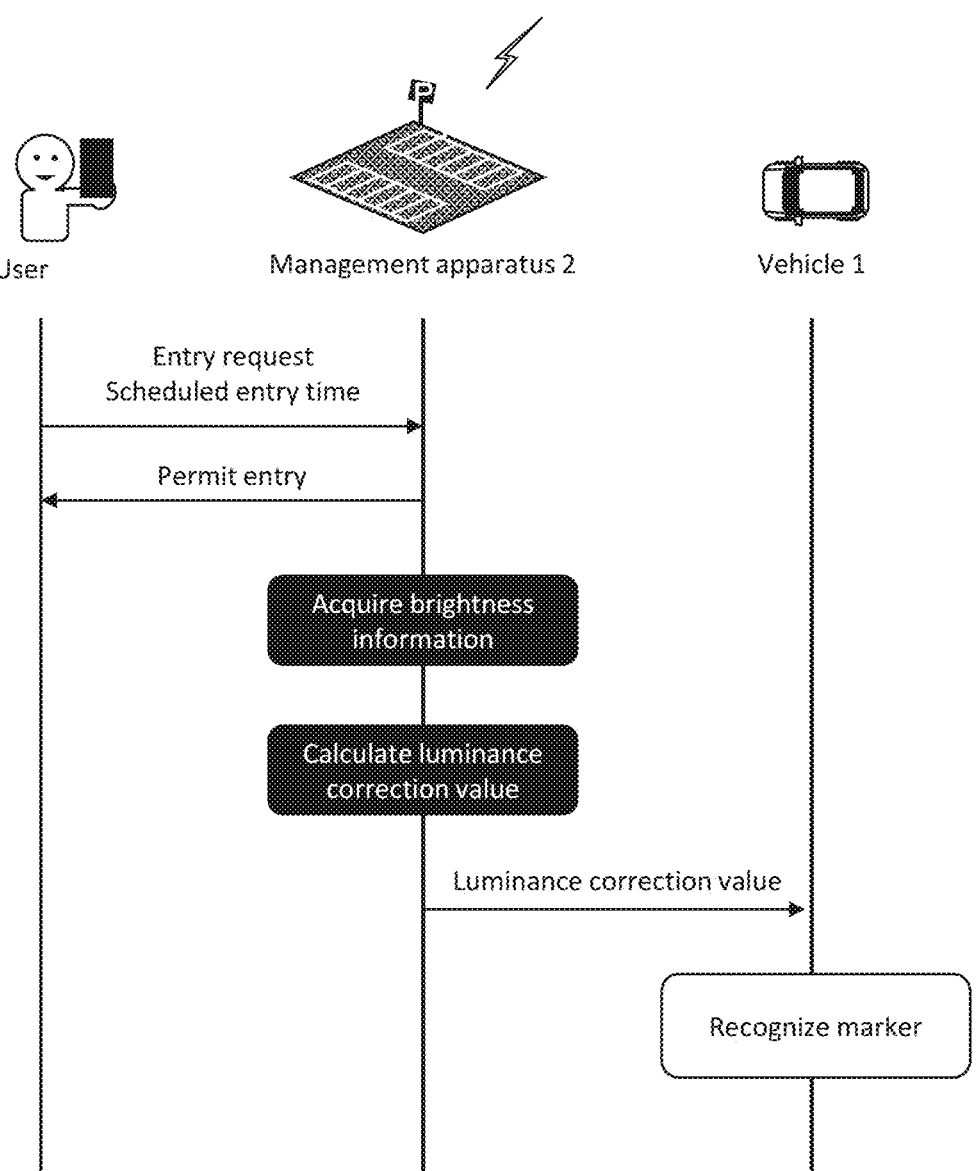
FIG. 6 is a conceptual diagram for explaining an example of a flow of processing by a moving body support system according to the present embodiment.

FIGS. 6 to 9 are diagrams showing examples of a flow of processing related to the luminance correction value. In FIG. 6, first, an entry request that the vehicle 1 enter the parking lot is transmitted from a user terminal of a user of the parking lot (automated valet parking) to the management apparatus 2. At this time, the user terminal may transmit the scheduled entry time of the vehicle 1 together with the entry request. When the vehicle 1 can enter, the management apparatus 2 permits the entry request of the vehicle 1 and notifies the user terminal that the entry of the vehicle 1 is permitted. When the entry request of the vehicle 1 is permitted, the management apparatus 2 acquires the brightness information. The brightness information is acquired by the management apparatus 2 by performing estimation using brightness estimation information. The brightness estimation information is information used for estimating illuminance in the parking lot, a position of a shadow, or the like. The brightness estimation information may include information in which the scheduled entry time of the vehicle 1 is considered. A specific example and a way of acquisition of the brightness estimation information will be described later.

The management apparatus 2 calculates the luminance correction value of the marker M based on the acquired brightness information. The management apparatus 2 transmits the calculated luminance correction value to the vehicle 1. The vehicle 1 performs marker recognition using the luminance correction value. Specifically, the vehicle 1 captures an image assumed to include the marker M around the vehicle 1 by using the camera. The vehicle 1 corrects the luminance of the captured image by using the luminance correction value, and recognizes the marker M based on the corrected image. In this way, by performing marker recognition based on the image corrected by using the luminance correction value, it is possible to reduce influence of change in brightness at the position of the marker M and improve the accuracy of marker recognition. The marker M which is a target recognized by the vehicle 1 may be referred to as a "target marker".

In the case of the example shown in FIG. 6, the acquisition of the brightness information and the calculation of the luminance correction value are performed by the management apparatus 2. In other words, the vehicle 1 does not need to acquire the brightness information and calculate the luminance correction value. Therefore, a load of processing on the vehicle 1 is greatly reduced.

Figure 7:
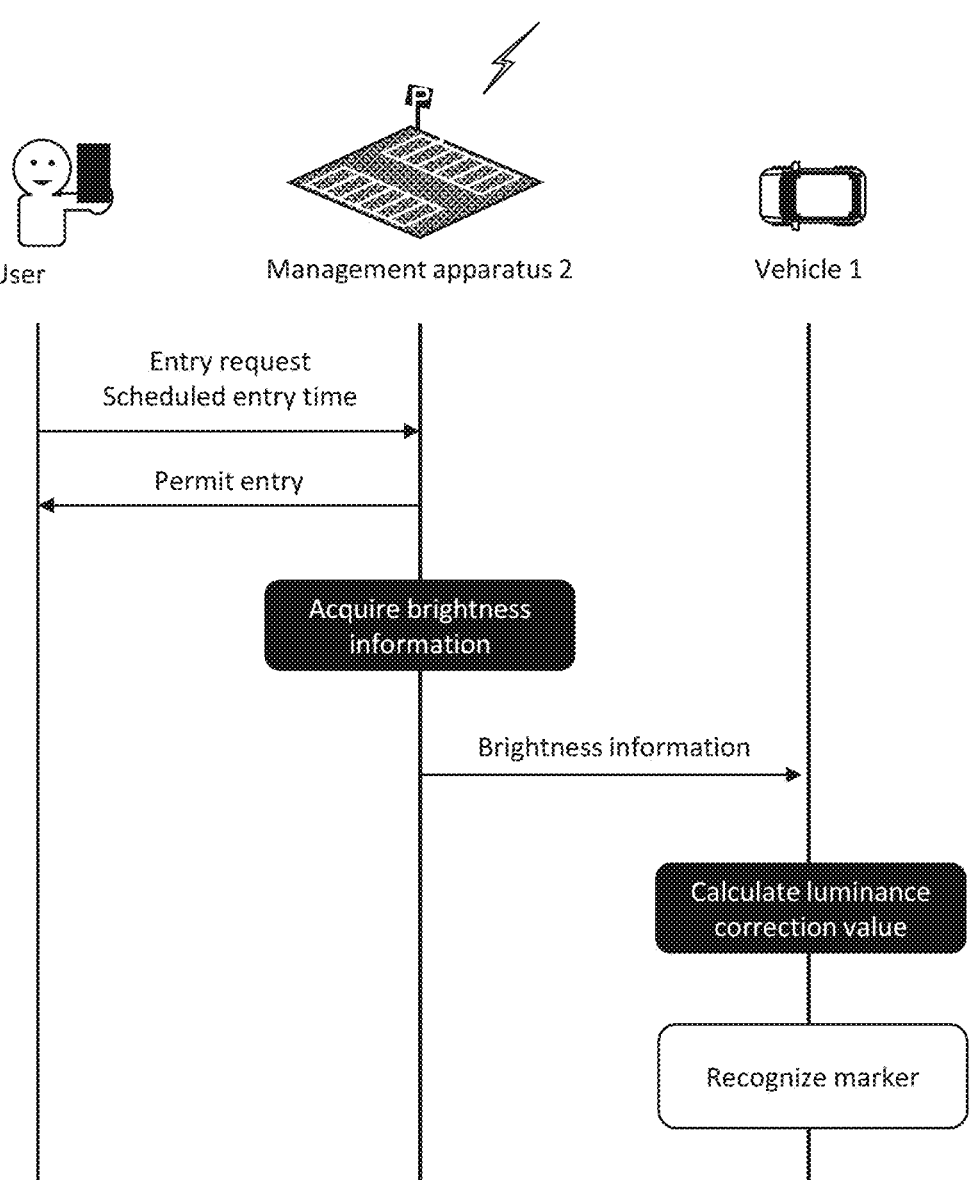
FIG. 7 is a conceptual diagram for explaining an example of a flow of processing by a moving body support system according to the present embodiment.

FIG. 7 is a diagram showing another example of a flow of processing related to the luminance correction value. The luminance correction value may be calculated by the vehicle 1 as shown in FIG. 7. In FIG. 7, the management apparatus 2 transmits the acquired brightness information to the vehicle 1, and the vehicle 1 calculates the luminance correction value of the marker M based on the transmitted brightness information. The vehicle 1 captures an image assumed to include the marker M using the camera and corrects the luminance of the captured image by using the luminance correction value. The vehicle 1 can improve the accuracy of the marker recognition by recognizing the marker M based on the corrected image.

In the example shown in FIG. 7, the brightness information is acquired by the management apparatus 2. That is, the vehicle 1 does not need to acquire at least the brightness information. Therefore, a load of processing on the vehicle 1 is reduced.

Figure 8:
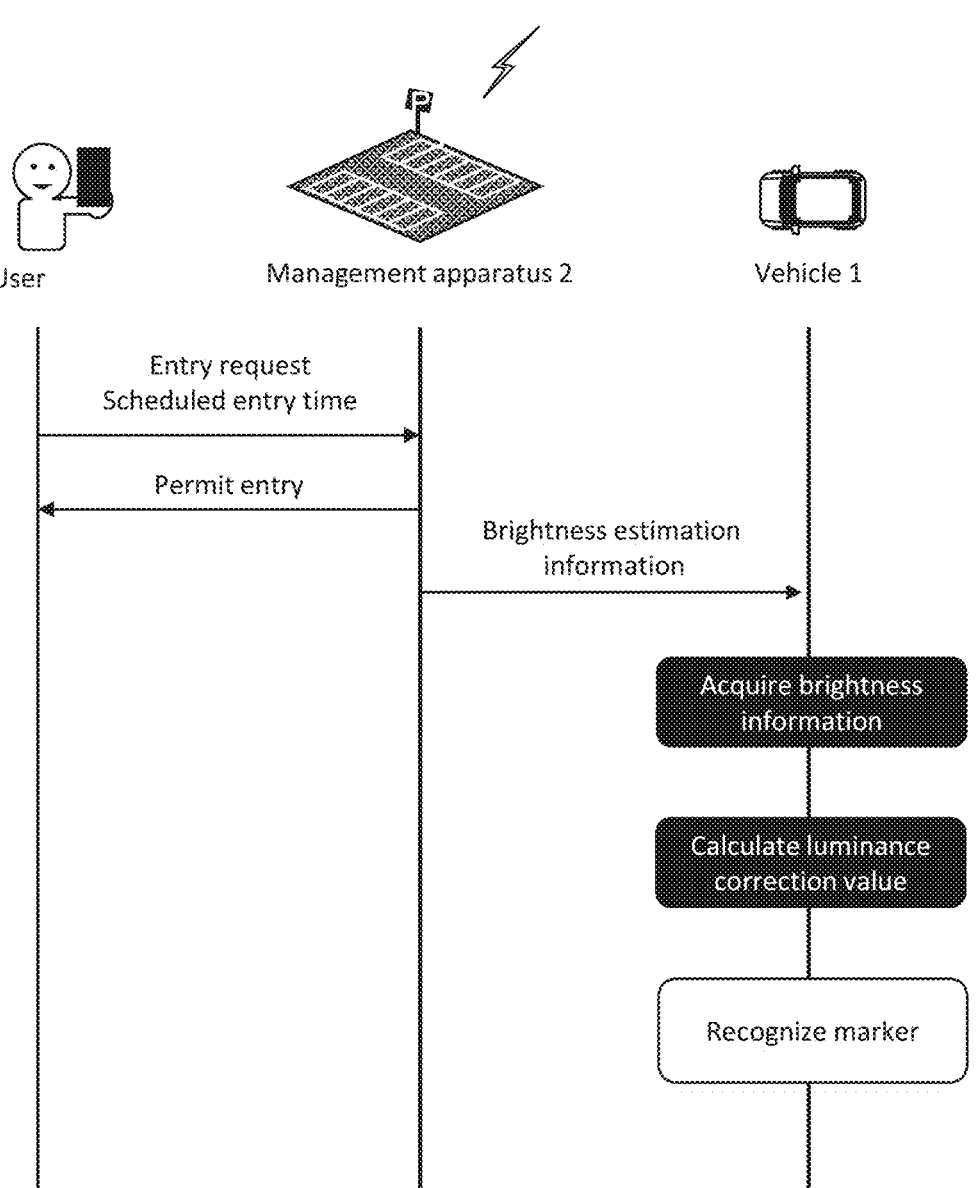
FIG. 8 is a conceptual diagram for explaining an example of a flow of processing by a moving body support system according to the present embodiment.

FIG. 8 is a diagram showing another example of a flow of processing related to the luminance correction value. The brightness information may be acquired by the vehicle 1 as shown in FIG. 8. At this time, a part or all of the brightness estimation information may be transmitted from the management apparatus 2 to the vehicle 1. For example, information about the position of the parked vehicle 3 in the parking lot at the scheduled entry time of the vehicle 1 is transmitted from the management apparatus 2 to the vehicle 1 as the brightness estimation information. The vehicle 1 estimates the brightness at the position of the marker M using the brightness estimation information and acquires the brightness information. The vehicle 1 calculates the luminance correction value of the marker M based on the brightness information. The vehicle 1 acquires an image assumed to include the marker M using the camera, and corrects the luminance of the acquired image using the luminance correction value. The vehicle 1 can improve the accuracy of the marker recognition by recognizing the marker M based on the corrected image.

Figure 9:
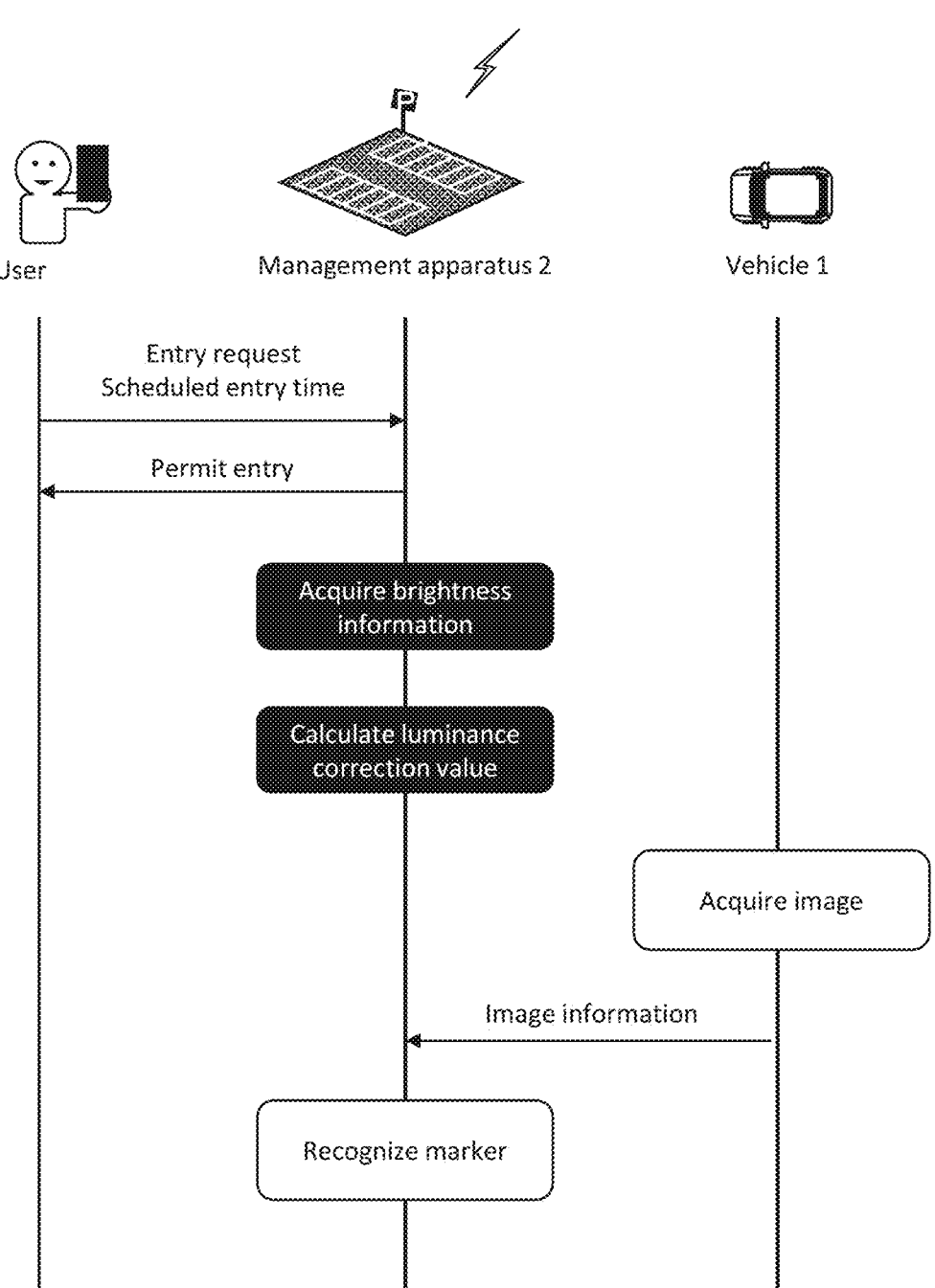
FIG. 9 is a conceptual diagram for explaining an example of a flow of processing by a moving body support system according to the present embodiment.

FIG. 9 is a diagram showing another example of a flow of processing related to the calculation of the luminance correction value. In the example of FIG. 9, the management apparatus 2 acquires the brightness information, calculates the luminance correction value, and performs marker recognition. The vehicle 1 captures an image assumed to include the marker M using the camera, and transmits the acquired image to the management apparatus 2. The management apparatus 2 corrects the luminance of the image transmitted from the vehicle 1 using the luminance correction value, and recognizes the marker M based on the corrected image. The management apparatus 2, for example, acquires position information of the vehicles 1 by recognizing the marker M, and transmits the acquired position information to the vehicles 1. In FIG. 9, the management apparatus 2 recognizes the marker M based on the corrected image, thereby also improve the accuracy of the marker recognition.

As will be described later, the brightness at the position of the marker M is estimated by using the brightness estimation information. The brightness estimation information is information used for estimating illuminance in the parking lot, a position of a shadow, or the like. Typically, the brightness estimation information does not include a camera image captured by the camera mounted on vehicle 1. In this case, the moving body support system can estimate the brightness at the position of the marker M without using the marker image. As a comparative example, estimation of brightness around the vehicle 1 based on a camera image is considered. In the case of the comparative example, it is necessary to analyze the camera image for each frame, which causes an increase in a load of processing. On the other hand, according to the present embodiment, since it is not necessary to estimate the brightness for each frame of the image, a load of processing is reduced.

The brightness estimation process without using the camera image may be performed in advance before the entry of the vehicle 1. Further, the luminance correction value may also be calculated in advance before the entry of the vehicle 1. By performing necessary processing in advance before the entry of the vehicle 1, it is possible to reduce a load of processing after the entry of the vehicle 1 and to smoothly operate the vehicle 1. In addition, by performing necessary processing in advance, it is possible to suppress the influence of processing delay. For example, a situation in which the accuracy of the marker recognition cannot be obtained as expected due to a processing delay is prevented.

The brightness estimation information may include a scheduled entry time of the vehicle 1. If the scheduled entry time of the vehicle 1 is acquired, the brightness at the position of the marker M at the scheduled entry time can be estimated in advance, and the luminance correction value can be calculated in advance. The scheduled entry time is information unique to the automated valet parking in the parking lot. It can be said that performing necessary processing in advance based on the scheduled entry time is a feature unique to the automated valet parking in the parking lot.

Figure 2:
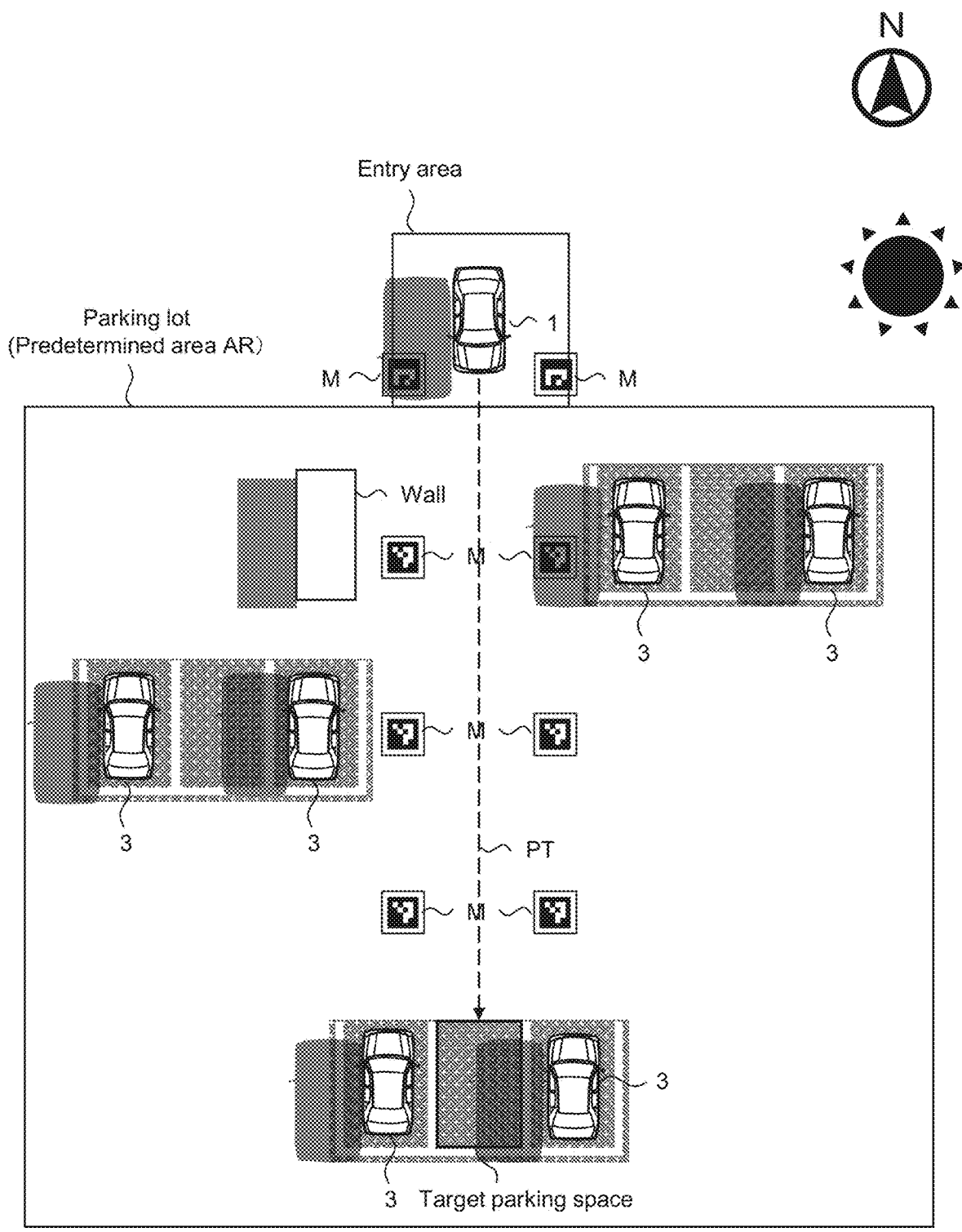
FIG. 2 is a conceptual diagram for explaining a problem.
Figure 3:
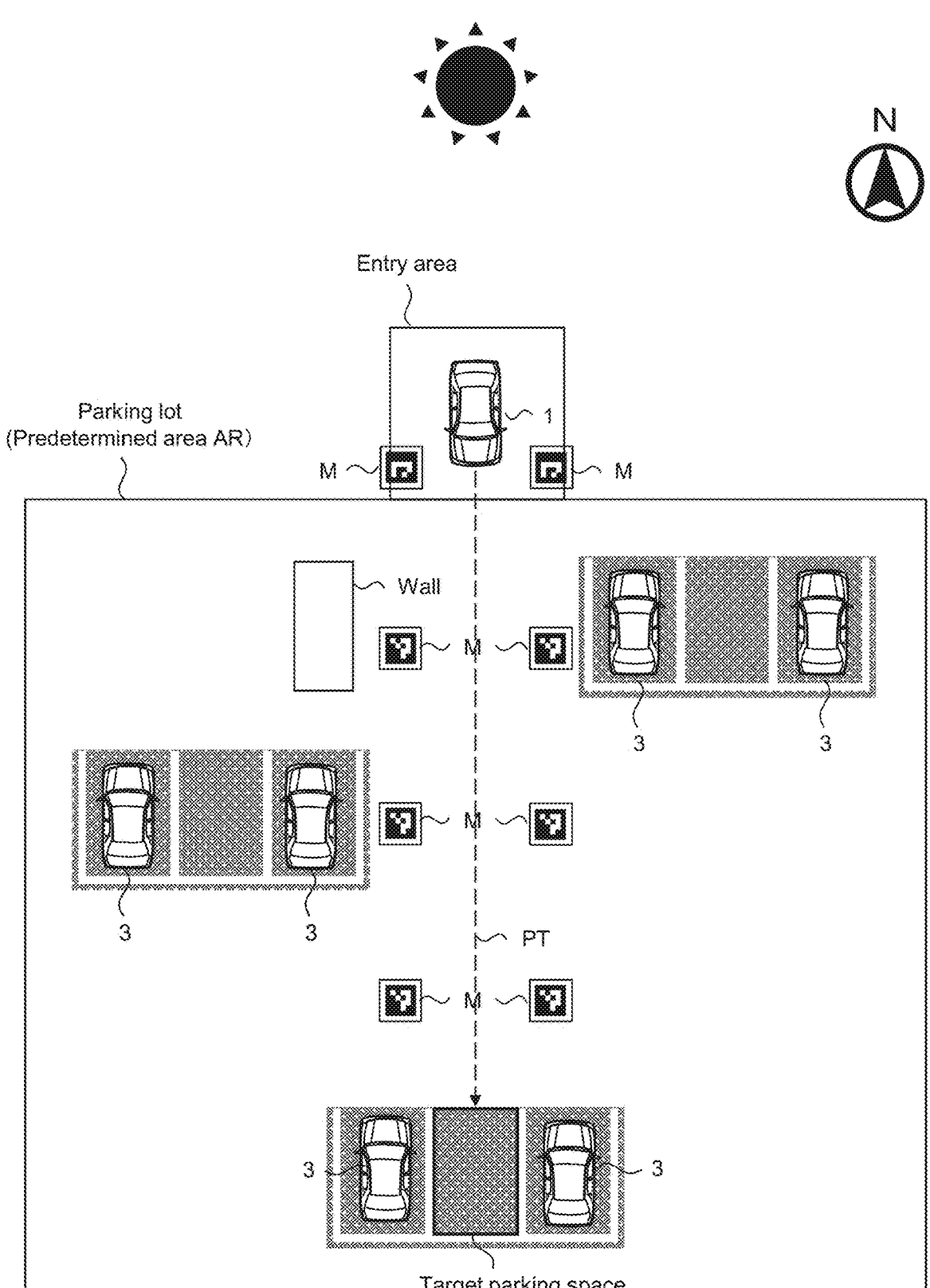
FIG. 3 is a conceptual diagram for explaining a problem.
Figure 4:
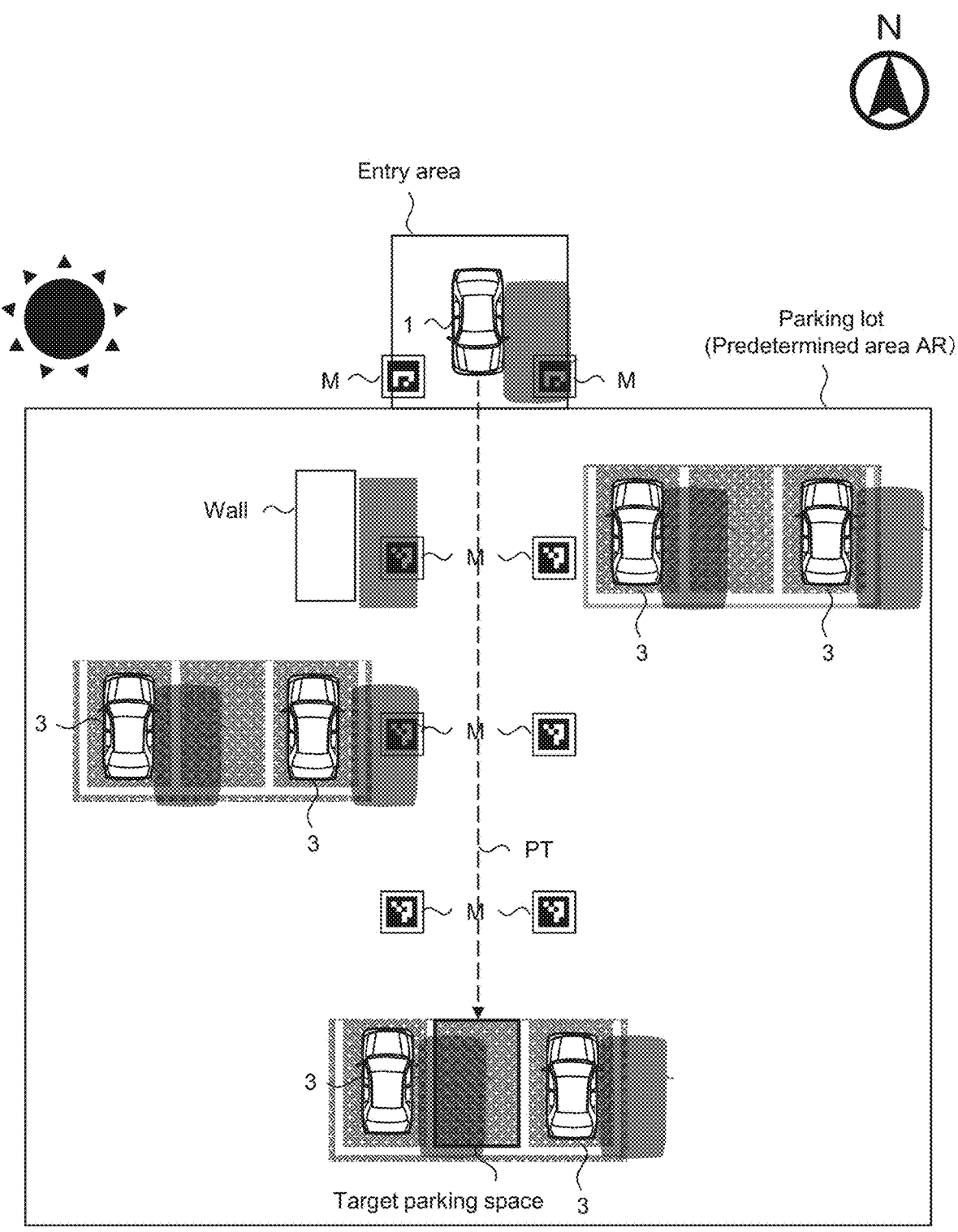
FIG. 4 is a conceptual diagram for explaining a problem.
Figure 5:
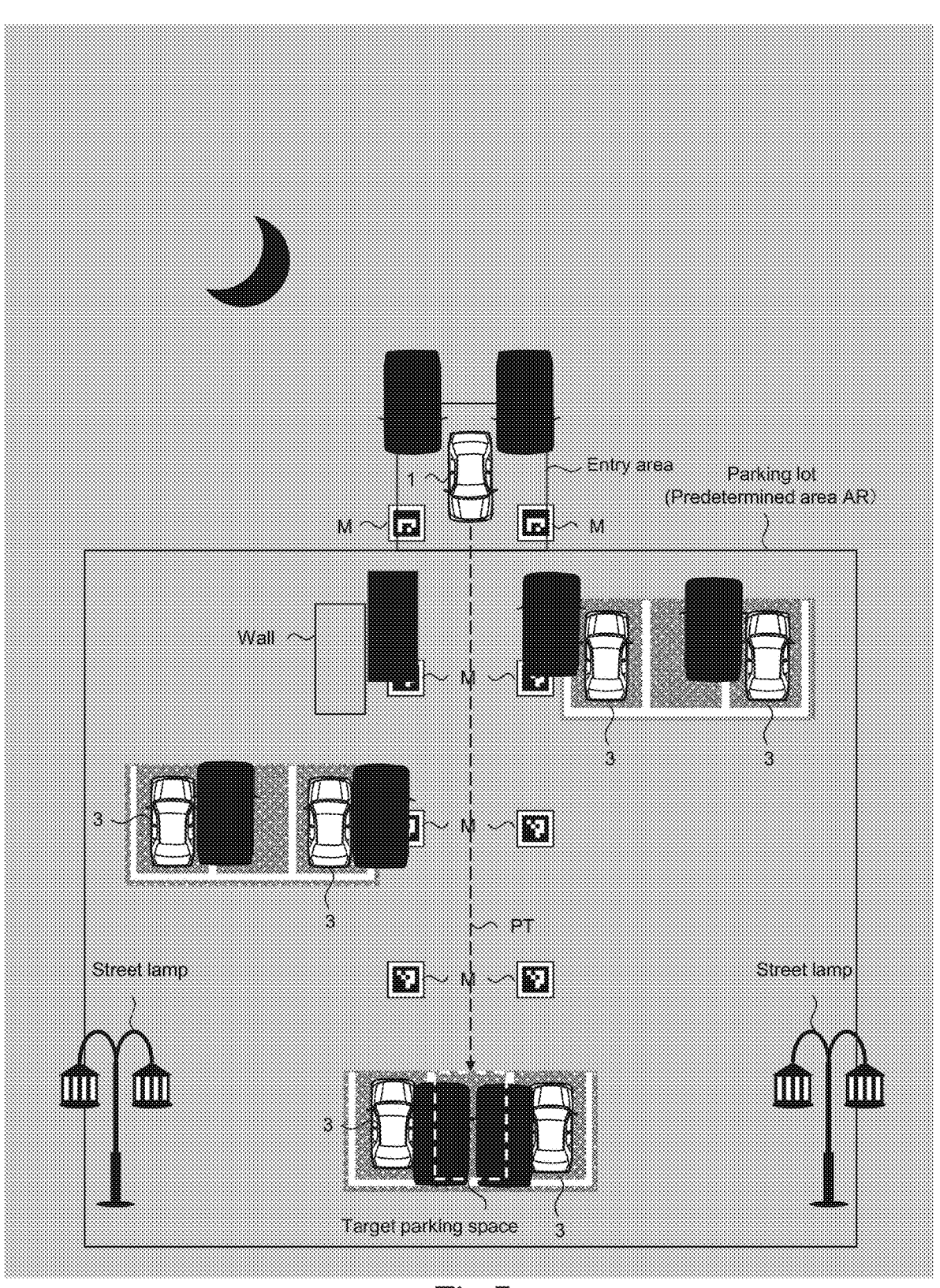
FIG. 5 is a conceptual diagram for explaining a problem.

In addition, as shown in FIGS. 2, 4, and the like, there is a case where shadows created by the parked vehicles 3 falls on some of the markers M and the brightness at the positions of the markers M become dark. Therefore, the brightness estimation information may include information on the parking position of the parked vehicles 3 in the parking lot. In the case of the automated valet parking, the management apparatus 2 grasps the parking position of the parked vehicles 3 in the parking lot. It can be said that the estimation of the brightness at the position of the marker M based on the parking position of the parked vehicle 3 in the parking lot is also a feature unique to the automated valet parking in the parking lot.

3. Configuration Example of Vehicle 1

Figure 10:
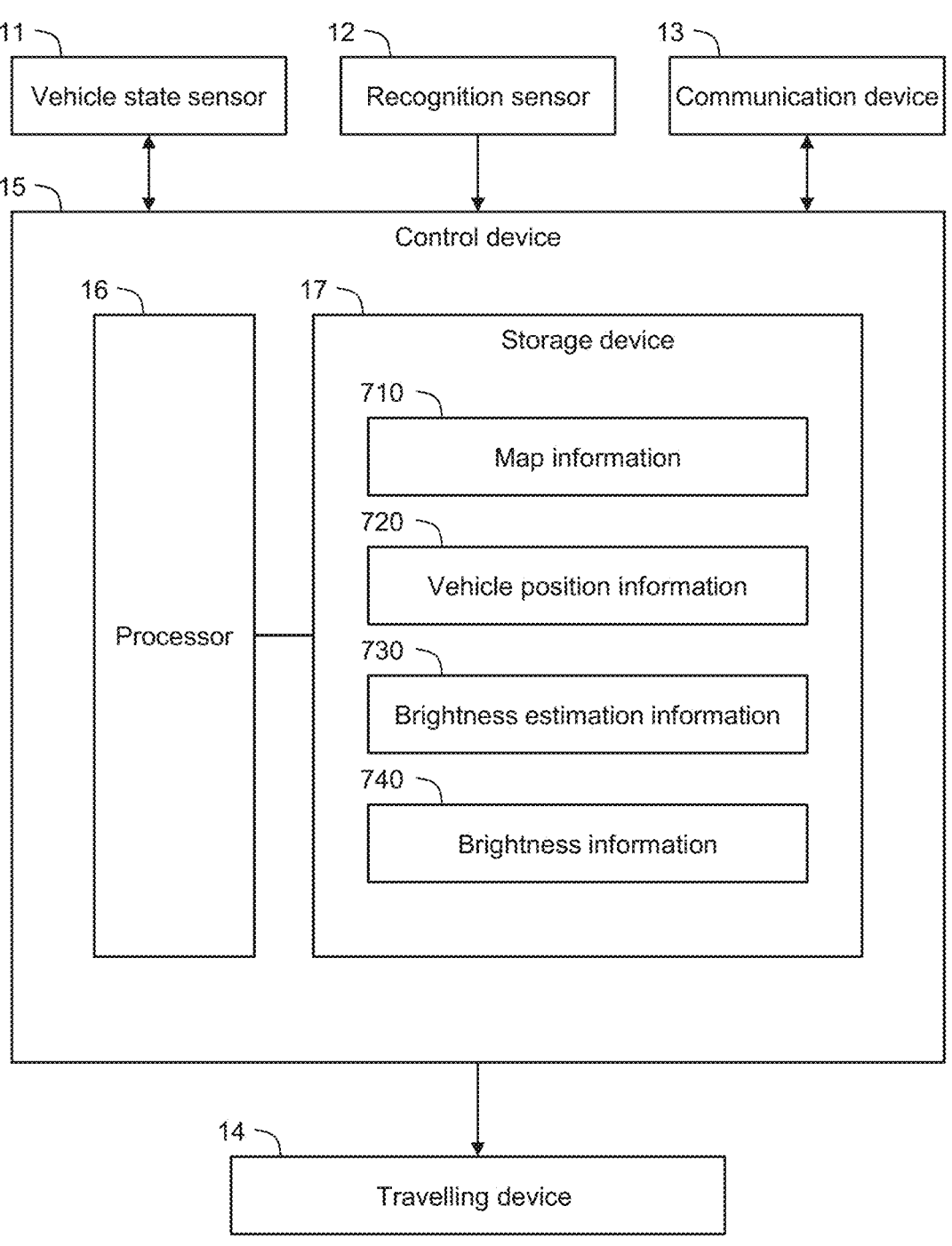
FIG. 10 is a block diagram showing a configuration example of a vehicle.

FIG. 10 is a block diagram showing a configuration example of the vehicle 1. The vehicle 1 includes a vehicle state sensor 11, a recognition sensor 12, a communication device 13, a travelling device 14, and a control device 15.

The vehicle state sensor 11 detects a state of the vehicle 1. Examples of the vehicle state sensor 11 include a vehicle speed sensor (wheel speed sensor), a steering angle sensor, a yaw rate sensor, and a lateral acceleration sensor.

The recognition sensor 12 recognizes a situation around the vehicle 1. The recognition sensor 12 includes the camera. Other examples of the recognition sensor 12 include a LIDAR (laser imaging detection and ranging), a radar, an illuminance sensor, and the like.

The communication device 13 communicates with the outside of the vehicle 1. For example, the communication device 13 communicates with the management apparatus 2.

The travelling device 14 includes a steering device, a driving device, and a braking device. The steering device steers wheels of the vehicle 1. For example, the steering device includes an electric power steering (EPS) device. The driving device is a power source that generates a driving force. Examples of the driving device include an engine, an electric motor, an in-wheel motor, and the like. The braking device generates a braking force.

The control device 15 controls the vehicle 1. Specifically, the control device 15 includes one or more processors 16 (hereinafter, simply referred to as a processors 16) and one or more storage devices 17 (hereinafter, simply referred to as a storage devices 17). The processor 16 executes various processes. The storage device 17 stores various kinds of information. Examples of the storage device 17 include a volatile memory, a nonvolatile memory, an HDD (hard disk drive), a SSD (solid state drive), and the like. By the processor 16 executing a control program, which is a computer program, various processes by the control device 15 are realized. The control program is stored in the storage device 17 or recorded in a computer-readable recording medium.

The processor 16 acquires various types of information. The acquired various types of information are stored in the storage device 17. The various types of information include map information 710, vehicle position information 720, brightness estimation information 730, and brightness information 740.

The map information 710 is information about a map of the predetermined area AR. The map information 710 includes position information of the marker M, position information of the parking space, position information of a structure, position information of a light, position information of the entry area, and the like. The map information 710 may be provided to the vehicle 1 by a manager of the parking lot or the like. Alternatively, the map information 710 may be transmitted from the management apparatus 2 to the vehicle 1 via the communication device 13.

The vehicle position information 720 includes position information of the vehicle 1. The vehicle position information 720 includes position information of the vehicle 1 calculated from the vehicle state information acquired by the vehicle state sensor 11. Specifically, the processor 16 calculates the movement amount of the vehicle 1 based on vehicle speed or steering angle of the vehicle 1 acquired by the vehicle speed sensor or the steering angle sensor, thereby calculate the position information of the vehicle 1. The vehicle position information 720 includes the position information of the vehicle 1 calculated in this way.

Further, the processor 16 corrects the position information of the vehicle 1 by comparing an installation position of the marker M indicated by the map information 710 with a recognition position of the marker M by the camera. Thus, the processor 16 performs self-position estimation that estimates the position of the vehicle 1 with high accuracy. By repeating the calculation of the position information based on the vehicle state information and the correction based on the marker recognition, the processor 16 can continuously acquire position information of the vehicle 1 with high accuracy. The vehicle position information 720 includes highly accurate position information of the vehicle 1 acquired by the self-position estimation.

The vehicle position information 720 may also include information about the target path PT. The target path PT is calculated from the current position of the vehicle 1 or the position of the entry area, and the position of the target parking space. The target path PT may be calculated in advance from the position of the entry area and the position of the target parking space before the entry of the vehicle 1. Alternatively, the target path PT may be calculated from the current position of the vehicle 1 and the position of the target parking space after the entry of the vehicle 1. The target path PT may be calculated by the management apparatus 2 and provided to the vehicle 1, or may be calculated by the processor 16.

The brightness estimation information 730 is information used for estimating the brightness at the position of the marker M. An example of the brightness estimation information 730 will be described later.

The brightness information 740 is information indicating brightness at the position of the marker M. A way of acquiring the brightness information 740 will be described later.

4. Configuration Example of Management Apparatus 2

Figure 11:
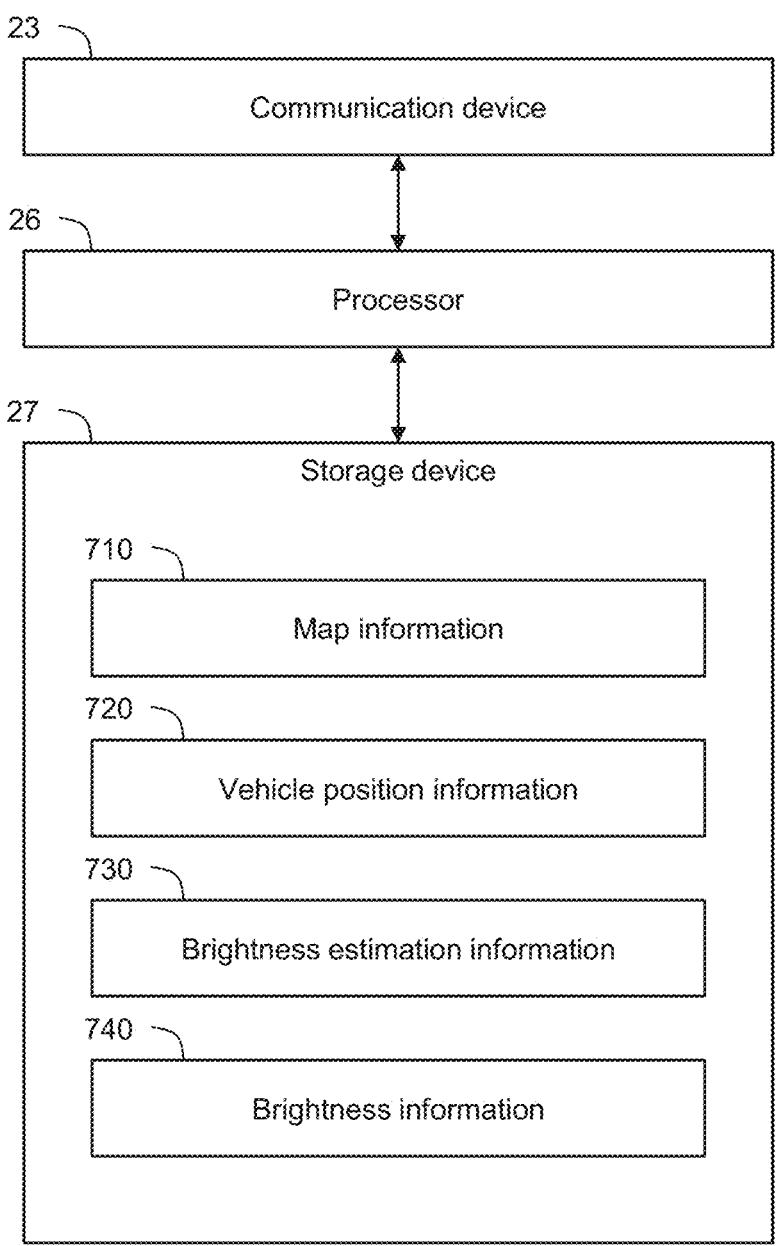
FIG. 11 is a block diagram showing a configuration example of a management apparatus.

FIG. 11 is a block diagram showing a configuration example of the management apparatus 2. The management apparatus 2 includes a communication device 23, one or more processors 26 (hereinafter simply referred to as a processor 26), and one or more storage devices 27 (hereinafter simply referred to as a storage device 27).

The communication device 23 communicates with the vehicle 1 via a communication network. The communication device 23 may communicate with the parked vehicle 3. The communication device 23 may also communicate with an infrastructure sensor. The infrastructure sensor is a sensor installed in the predetermined area AR and includes an infrastructure camera, an infrastructure illuminance sensor, and the like.

The processor 26 executes various processes. The storage device 27 stores various kinds of information. Examples of the storage device 27 include a volatile memory, a nonvolatile memory, an HDD, an SSD, and the like. When the processor 26 executes a control program, which is a computer program, various processes by the management apparatus 2 are realized. The control program is stored in the storage device 27 or recorded in a computer-readable recording medium.

The map information 710 is provided to the management apparatus 2 by a manager of the parking lot or the like and is stored in the storage device 27. The processor 26 may communicate with the vehicle 1 via the communication device 23 and transmit the map information 710 to the vehicle 1.

The vehicle position information 720 includes position information of the vehicle 1, information on the target path PT, and the like.

The position information of the vehicle 1 may be acquired by the processor 26 communicating with the vehicle 1 via the communication device 23. Alternatively, the position information of the vehicle 1 may be acquired by the infrastructure camera installed in the predetermined area AR.

The target path PT may be acquired by the processor 26 calculating based on the current position of the vehicle 1 or the position of the entry area and the position of the target parking space. Alternatively, the processor 26 may communicate with the vehicle 1 to acquire the target path PT calculated by the processor 16 of the vehicle 1.

An example of the brightness estimation information 730 and a way of acquiring the brightness information 740 will be described later.

5. Moving Body Support Process

Hereinafter, an example of a moving body support process by the moving body support system according to the present embodiment will be described in detail.

Figure 12:
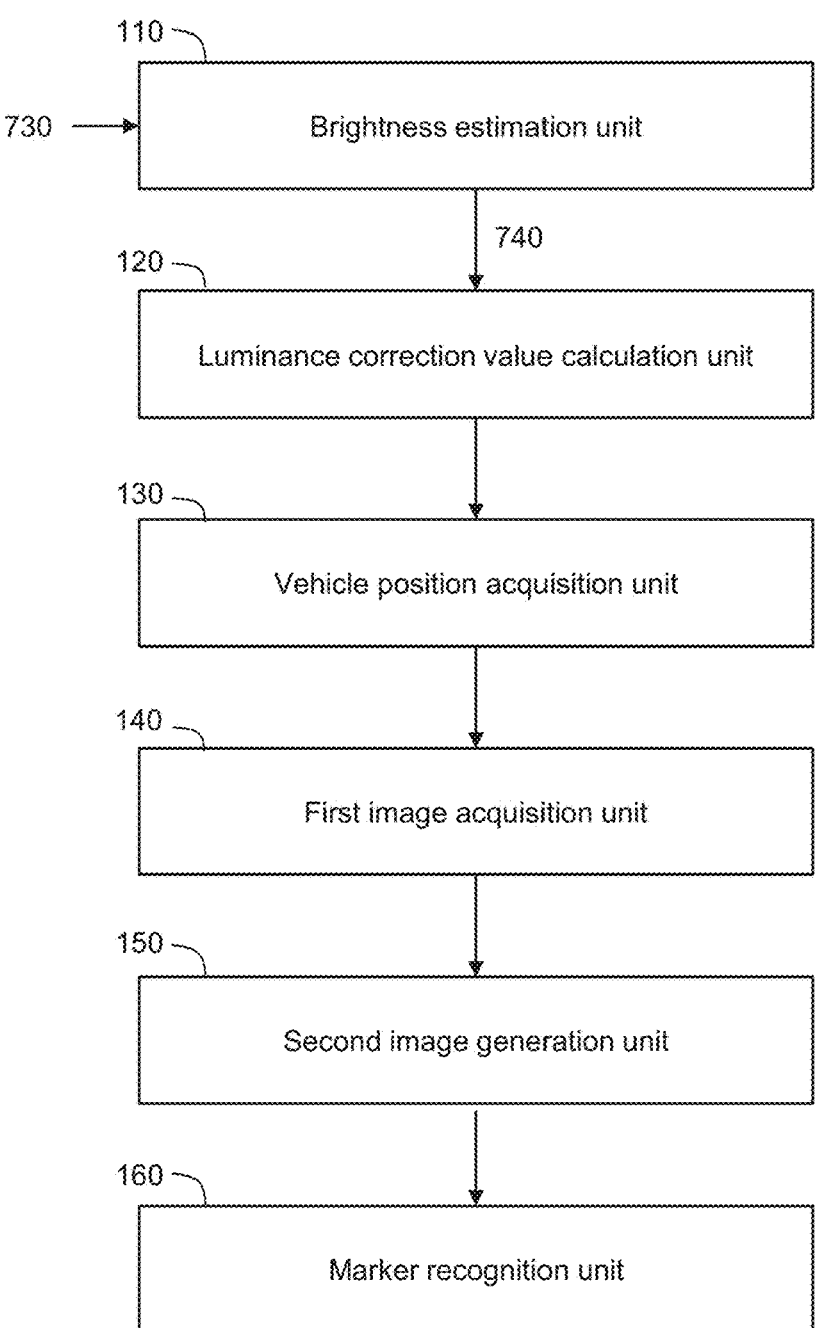
FIG. 12 is a block diagram for explaining an example of a moving body support process according to the present embodiment.

FIG. 12 is a block diagram showing a functional configuration example of the moving body support system according to the present embodiment. The moving body support system includes, as functional units, a brightness estimation unit 110, a luminance correction value calculation unit 120, a vehicle position acquisition unit 130, a first image acquisition unit 140, a second image generation unit 150, and a marker recognition unit 160. These functional units may be realized by the processor 16 executing a control program, which is a computer program, or may be realized by the processor 26 executing a control program, which is a computer program. Alternatively, each functional unit may be realized by distributed processes by the processor 16 and the processor 26.

Figure 13:
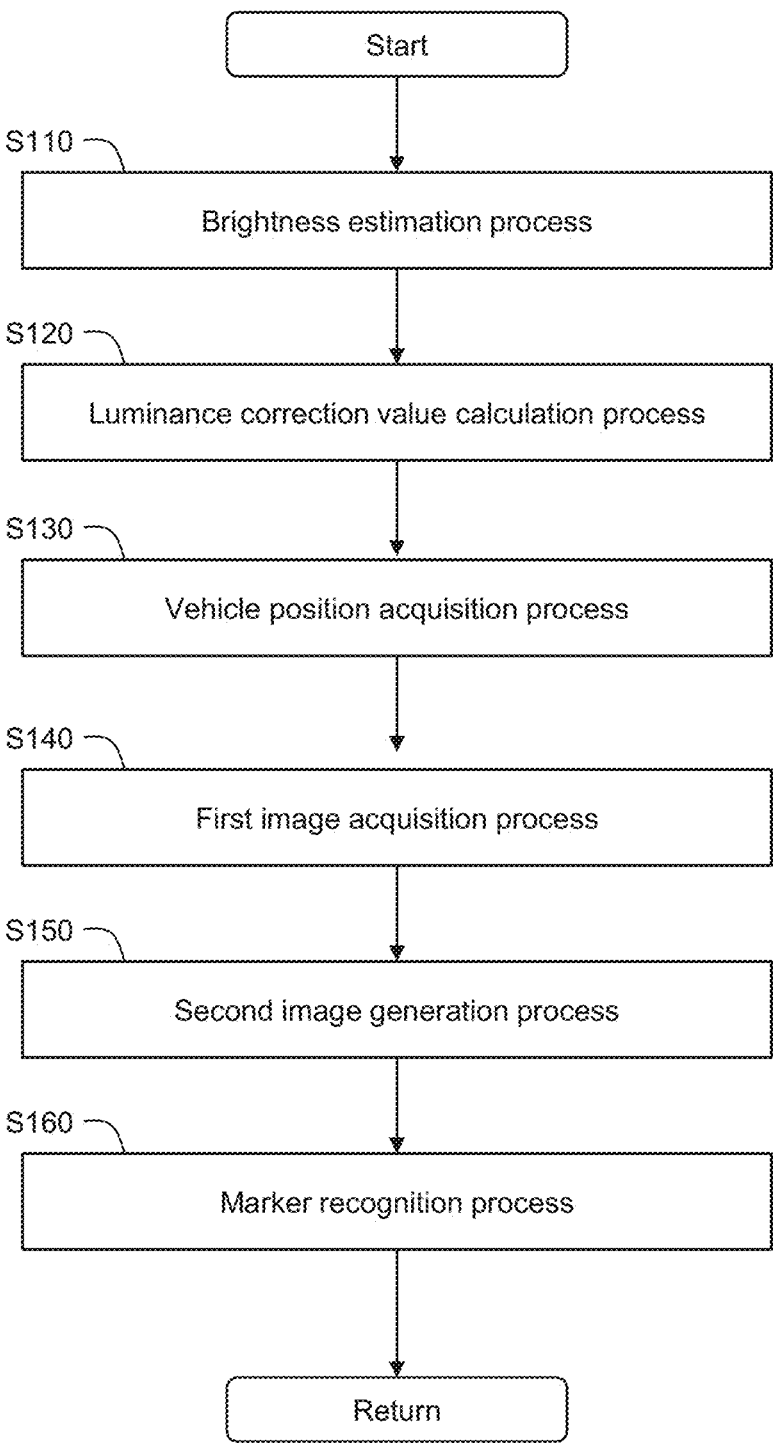
FIG. 13 is a flowchart showing a first example of a moving body support process according to the present embodiment.

FIG. 13 is a flowchart showing the first example of the moving body support process according to the present embodiment. The first example of the moving body support process will be described with reference to FIGS. 12 and 13.

5-1. Brightness Estimation Process (Step S110)

In Step S110, the brightness estimation unit 110 performs a brightness estimation process that estimate the brightness at the position of the marker M. The brightness estimation process may be performed before the entry of the vehicle 1 or may be performed after the entry of the vehicle 1.

5-1-1. Brightness Estimation Information

The brightness estimation information 730 is information referred to when the brightness is estimated. The brightness estimation unit 110 estimates the brightness at the position of the marker M based on the position information of the marker M and the brightness estimation information 730 and acquires the brightness information 740.

Figure 14:
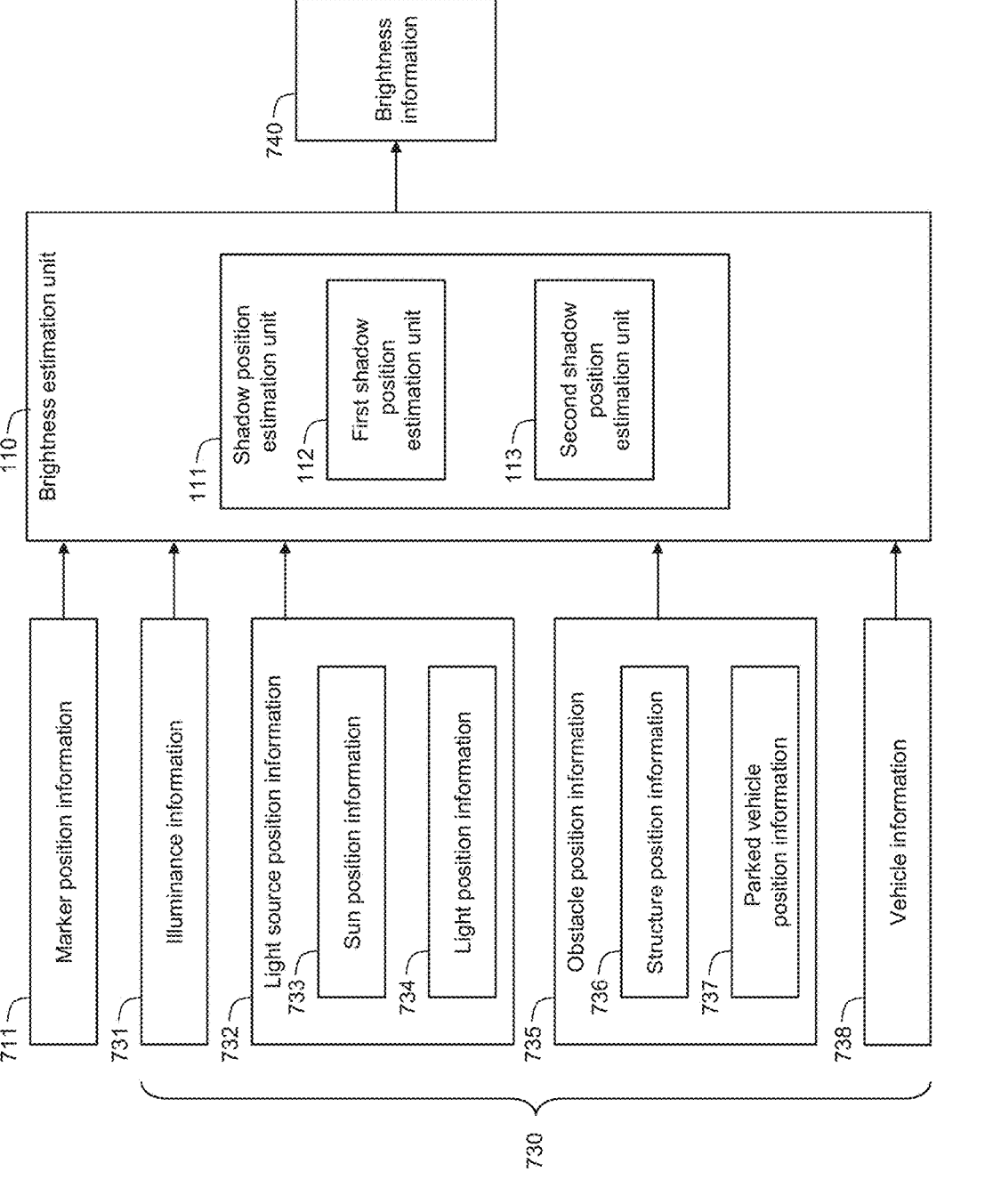
FIG. 14 is a block diagram for explaining an example of a brightness estimation process according to the present embodiment.

FIG. 14 is a block diagram for explaining an example of the brightness estimation process by the brightness estimation unit 110. The brightness estimation unit 110 includes a shadow position estimation unit 111. The shadow position estimation unit 111 includes a first shadow position estimation unit 112 and a second shadow position estimation unit 113. Marker position information 711 is position information of the marker M in the predetermined area AR, and can be acquired from the map information 710. The brightness estimation information 730 includes illuminance information 731, light source position information 732, obstacle position information 735, and vehicle information 738.

The illuminance information 731 indicates at least one of illuminance at the position of the marker M and illuminance in the predetermined area AR. For example, the illuminance is estimated based on a date, an hour, weather information, sunshine information, and the like. In another example, the illuminance may be detected by an illuminance sensor. The illuminance sensor may be the infrastructure illuminance sensor installed in the predetermined area AR or may be an in-vehicle illuminance sensor mounted on the vehicle 1.

The light source position information 732 indicates the position of the light source. The light source position information 732 includes at least one of sun position information 733 and light position information 734. The sun position information 733 is information indicating the position of the sun, and is calculated based on the date and an hour. The light position information 734 is information about the light installed in the predetermined area AR and includes information about an installation position of the light. The light includes the street lamp installed in the predetermined area AR. The information on the installation position of the light is acquired from the map information 710.

The obstacle position information 735 indicates a position of an obstacle that may create a shadow in the predetermined area AR. The obstacle position information 735 includes at least one of structure position information 736 and parked vehicle position information 737.

The structure position information 736 indicates a position of a structure installed in the predetermined area AR. Examples of the structure include a column and a wall. The structure position information 736 is acquired from the map information 710.

The parked vehicle position information 737 indicates the position of the parked vehicle 3 in the predetermined area AR. The parked vehicle position information 737 can be acquired by the management apparatus 2 communicating with the parked vehicle 3. Alternatively, the parked vehicle position information 737 may be acquired by the management apparatus 2 communicating with the infrastructure camera. The management apparatus 2 may transmit the acquired parked vehicle position information 737 to the vehicle 1.

The vehicle information 738 includes at least one of a current position and a future position of the vehicle 1. The current position of the vehicle 1 is acquired from the vehicle position information 720. The current position of the vehicle 1 may be position information of the vehicle 1 calculated from vehicle state information, may be position information of the vehicle 1 acquired by highly accurate self-position estimation, or may be information acquired by the infrastructure camera. The future position of the vehicle 1 is acquired as the position of the vehicle 1 on the target path PT. The target path PT is acquired from the vehicle position information 720. The vehicle information 738 may further include vehicle size information indicating the size of the vehicle 1. The size of the vehicle 1 is at least one of a length, a width, and a height of the vehicle 1. The vehicle size information can be acquired in advance by the storage device 17 of the vehicle 1. The vehicle size information may be provided to the management apparatus 2 and stored in the storage device 27.

The shadow position estimation unit 111 performs a shadow position estimation process that estimates a position of a shadow in the predetermined area AR. The position of the shadow includes a first shadow position estimated by the first shadow position estimation unit 112 and a second shadow position estimated by the second shadow position estimation unit 113.

The first shadow position estimation unit 112 estimates the first shadow position, which is a position of a shadow created by a light source and an obstacle in the predetermined area AR. The position of the light source is acquired from the light source position information 732. The position of the obstacle in the predetermined area AR is acquired from the obstacle position information 735. The first shadow position estimation unit 112 performs a first shadow position estimation process that estimates the first shadow position based on the light source position information 732 and the obstacle position information 735.

The second shadow position estimation unit 113 estimates a second shadow position, which is a position of a shadow created by the light source and the vehicle 1. The position of the light source is acquired from the light source position information 732. The position of the vehicle 1 is acquired from the vehicle information 738 as a current position or a future position of the vehicle 1. When the brightness estimation process is performed before the entry of the vehicle 1, the position of the vehicle 1 acquired by the second shadow position estimation unit 113 is the future position of the vehicle 1. The second shadow position estimation unit 113 performs the second shadow position estimation process, which estimates the second shadow position, based on the light source position information 732 and the vehicle information 738. In the second shadow position estimation process, the second shadow position may be estimated by using the vehicle size information in addition to the position of the light source and the position of the vehicle 1. The vehicle size information is acquired from the vehicle information 738.

Figure 15:
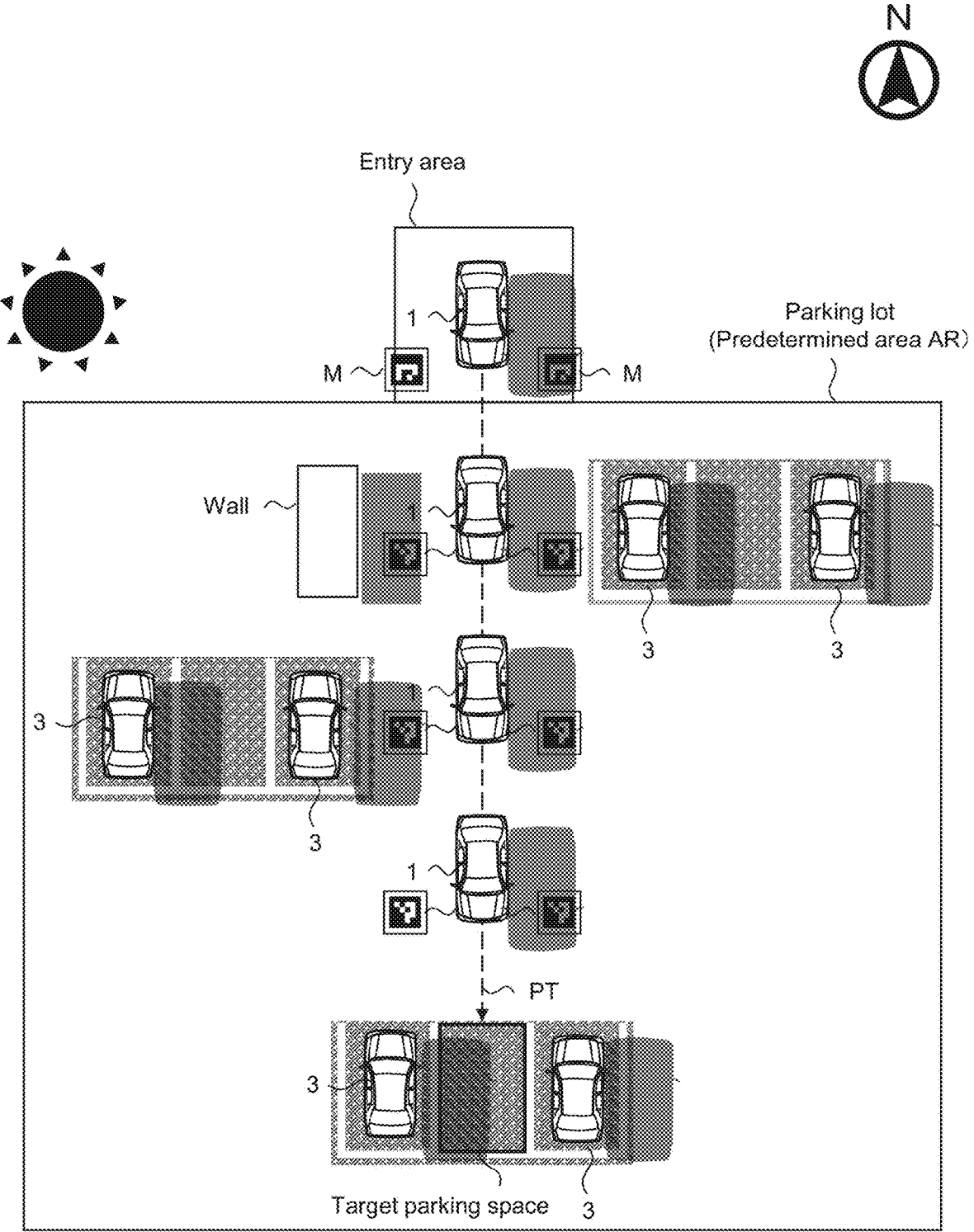
FIG. 15 is a conceptual diagram for explaining an effect of a second shadow position estimation process according to the present embodiment.

FIG. 15 shows an example in which the shadow is created at the position of the marker M by the light source and the vehicle 1 and the brightness at the position of the marker M changes. Since the shadow position estimation unit 111 includes the second shadow position estimation unit 113, it is possible to accurately estimate the brightness at the position of the marker M even in the case of FIG. 15.

The brightness estimation process performed by the brightness estimation unit 110 includes estimating the brightness at the position of the marker M based on the illuminance information 731 and the marker position information 711. The brightness estimation process may further include estimating the brightness at the position of the marker M based on the position of the shadow acquired by the marker position estimation process and the marker position information 711. The brightness information 740 acquired by the brightness estimation process may be acquired at once for all of the markers M in the parking lot, or may be acquired only for some of the markers M. In a case where it is acquired only for some of the markers M, for example, it may be acquired only for the markers M located near the future position of the vehicle 1.

5-1-2. Scheduled Entry Time

The brightness estimation unit 110 may acquire information about the scheduled entry time of the vehicle 1 and perform the brightness estimation process using the brightness estimation information 730 at the scheduled entry time. The scheduled entry time is transmitted from the user terminal or the like to the management apparatus 2 or the vehicle 1 and is acquired by the processor 16 or the processor 26.

The illuminance information 731 at the scheduled entry time is estimated based on the season, the position of the sun at the entry time, the weather information at the entry time, the sunshine information, and the like.

The light source position information 732 at the scheduled entry time includes at least one of the sun position information 733 and the light position information 734 at the scheduled entry time. The sun position information 733 at the scheduled entry time is calculated based on the season or the scheduled entry time.

The obstacle position information 735 at the scheduled entry time includes at least one of the structure position information 736 and the parked vehicle position information 737 at the scheduled entry time.

The parked vehicle position information 737 at the scheduled entry time can be calculated by the management apparatus 2 communicating with the user terminal or the like and acquiring the scheduled exit time of the parked vehicle 3 or the scheduled entry time of the AVP vehicle scheduled to enter. The management apparatus 2 may transmit the parked vehicle position information 737 at the acquired scheduled entry time to the vehicle 1.

The vehicle information 738 at the scheduled entry time is information about the future position of the vehicle 1. The future position of the vehicle 1 is acquired as the position of the vehicle 1 on the target path PT.

5-2. Luminance Correction Value Calculation Process (Step S120)

In Step S120, the luminance correction value calculation unit 120 calculates the luminance correction value. The luminance correction value is a value for correcting the luminance of the image including the marker M captured by the camera, and is calculated for each marker M based on the brightness information 740. The luminance correction value is set to darken an excessively bright image or brighten an excessively dark image. In other words, the luminance correction value is set so that the marker M can be more easily recognized. The luminance correction value may be a value for correcting luminance of each pixel of the image, or may be a value for correcting color according to the luminance of the image. The luminance correction value may be acquired at once for all of the markers M in the parking lot, or may be acquired only for some of the markers M. The luminance correction value calculation process may be performed before the entry of the vehicle 1 or may be performed after the entry of the vehicle 1.

5-3. Vehicle Position Acquisition Process (Step S130)

In Step S130, the vehicle position acquisition unit 130 acquires the position information of the vehicle 1. The position information of the vehicle 1 acquired by the vehicle position acquisition unit 130 is position information of the vehicle 1 calculated from the vehicle state information, and is acquired from the vehicle position information 720. Alternatively, the position information of the vehicle 1 acquired by the vehicle position acquisition unit 130 may be acquired by the infrastructure camera. The process of Step S130 and processes after Step S130 is performed after the entry of the vehicle 1.

5-4. First Image Acquisition Process (Step S140)

In Step S140, the first image acquisition unit 140 acquires a first image assumed to include a target marker Mt by using the camera mounted in the vehicle 1. The target marker Mt is a marker existing near of the current position of the vehicle 1 among the markers M. The target marker Mt is determined by estimating the marker M located near the current position of the vehicle based on the position information of the vehicle 1 acquired by the vehicle position acquisition unit 130 and the marker position information 711.

5-5. Second Image Generation Process (Step S150)

In Step S150, the second image generation unit 150 corrects the first image using the luminance correction value for the target marker Mt to acquire a second image.

FIG. 16 is a table showing an example of the luminance correction value. The luminance correction value may be, for example, a coefficient determined for each category such as daytime, nighttime, presence or absence of the shadow, or the like as shown in the table of FIG. 16. The second image is generated by correcting the luminance of each pixel of the first image using the coefficient, for example. The coefficient is set to 1 when the brightness at the position of the marker M is the reference brightness, and the value decreases as the brightness increases, and the value increases as the brightness decreases. The second image generation unit 150 calculates the luminance of each pixel of the image captured by the camera, and applies stronger correction to a pixel having higher luminance when the coefficient is smaller than 1. On the other hand, when the coefficient is larger than 1, stronger correction is applied to a pixel having lower luminance. In this way, the second image is generated by correcting the luminance for each pixel.

5-6. Marker Recognition Process (Step S160)

In Step S160, the marker recognition unit 160 recognizes the target marker Mt based on the second image. When the marker recognition unit 160 acquires the result of the recognition of the target marker Mt, the processing of the current cycle ends.

5-7. Effect

By the moving body support process described above, the luminance correction value for correcting the brightness of the image including the marker M (target marker Mt) is calculated in accordance with the luminance at the position of the marker M. The moving body support system can improve accuracy of recognition of the target marker Mt by correcting the luminance of the first image using the luminance correction value. Since accuracy of recognition of the target marker Mt is improved, accuracy of operation of the vehicle 1 based on the result of the recognition of the target marker Mt is also improved.

In the first example, the brightness estimation process and the luminance correction value calculation process can be performed in advance before the entry of the vehicle 1. By calculating the luminance correction value in advance, the time from when the vehicle 1 captures the image to when the marker recognition is performed is shortened, and the smooth operation of the vehicle 1 is enabled. In addition, since it is not necessary to calculate the luminance correction value every time the vehicle 1 moves, it is also possible to reduce a load of processing on the processor 16 of the vehicle 1 or the processor 26 of the management apparatus 2. Even when the luminance correction value calculation process is performed after the entry of the vehicle 1, it can be performed before the image is captured by the camera since the brightness information or the luminance correction value is acquired by using information about the weather, the time, or the like. A load of processing on the processor 16 of the vehicle 1 can be reduced compared with a case where the luminance of the image is checked every time the image is captured by the camera.

6. Second Example of Moving Body Support Process

Figure 17:
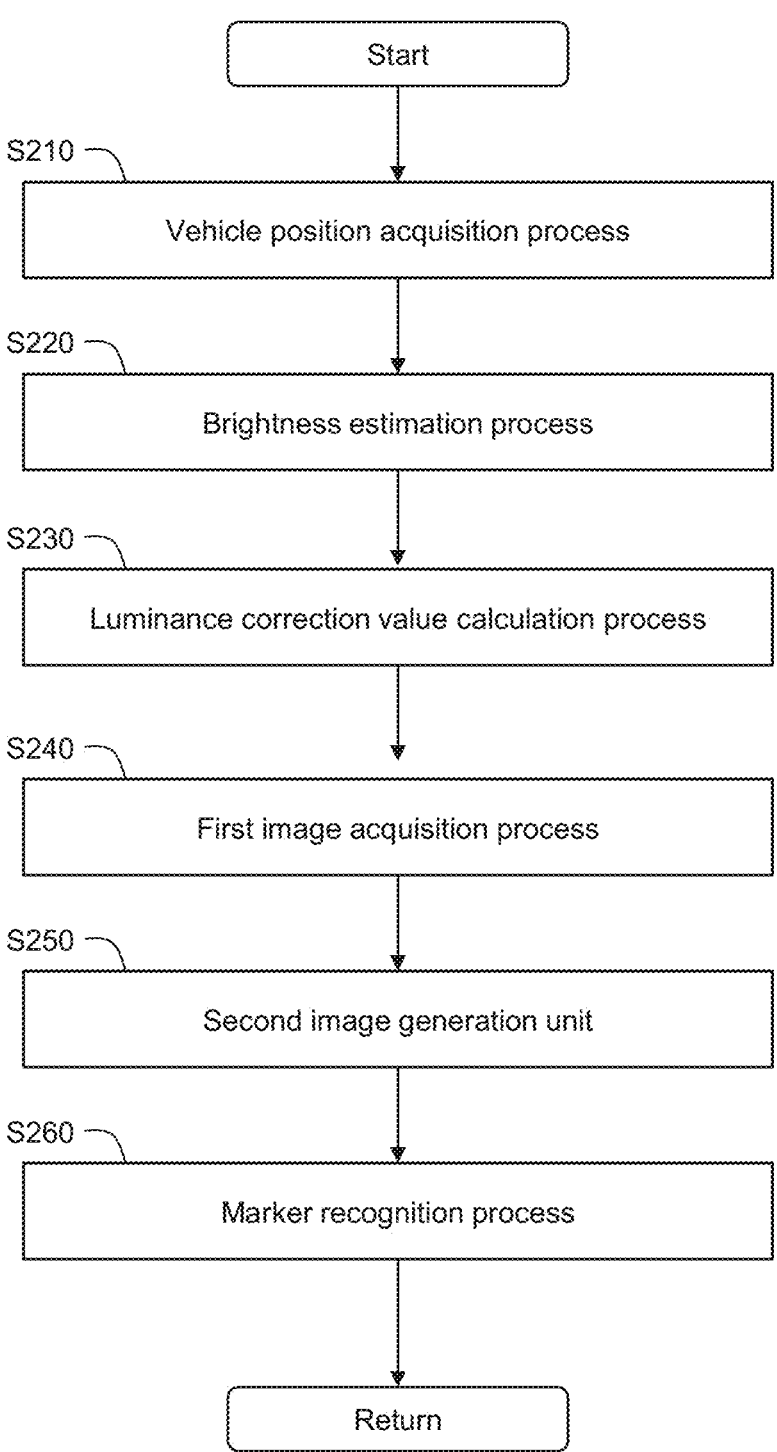
FIG. 17 is a flowchart showing a second example of a moving body support process according to the present embodiment.

FIG. 17 is a flowchart showing the second example of the moving body support process according to the present embodiment. The second example of the moving body support process will be described with reference to FIG. 17.

6-1. Vehicle Position Acquisition Process (Step S210)

In Step S210, the vehicle position acquisition unit 130 acquires the position information of the vehicle 1. The position information of the vehicle 1 is acquired from the vehicle position information 720 as information about the current position of the vehicle 1. Alternatively, the position information of the vehicle 1 may be acquired by the infrastructure camera. In the second example, the process of Step S210 and processes after Step 210 are performed after the entry of the vehicle 1.

6-2. Brightness Estimation Process (Step S220)

In Step S220, the brightness estimation unit 110 estimates the brightness at the position of the marker M. The brightness estimation unit 110 estimates the brightness at the position of the marker M based on the position information of the marker M and the brightness estimation information 730 and acquires the brightness information 740.

Among information included in the brightness estimation information 730, the vehicle information 738 is information about the current position of the vehicle 1. The current position of the vehicle 1 is acquired from the vehicle position information 720. Other information included in the brightness estimation information 730 is acquired by the brightness estimation unit in the same way as in Step 110.

5-2. Luminance Correction Value Calculation Process (Step S230)

In Step S230, the luminance correction value calculation unit 120 calculates the luminance correction value. The process in Step S230 is the same as the process in Step S120 in FIG. 13. After Step S240, the same processes as that after Step S140 in FIG. 13 are performed in Steps S250 and S260.

5-3. Effect

As in the first example, the moving body support system can improve accuracy of the marker recognition by correcting the luminance of the image using the luminance correction value. By improving accuracy of the marker recognition, accuracy of the operation of the vehicle 1 is also improved.

In the second example, the brightness estimation process and the luminance correction value calculation process are performed after the current position of the vehicle 1 is acquired. Since the brightness information 740 is estimated using the current position of the vehicle 1, an error of the brightness information 740 can be reduced. Also in the second example, it is not necessary to use the image captured by the camera to acquire the brightness information or the luminance correction value, and it is possible to reduce a load of processing on the processor 16 of the vehicle 1 compared with the case where the brightness information or the luminance correction value is calculated using the image.

6. Other Embodiments

The present disclosure is also applicable other than the automated valet parking of the vehicle 1 in the parking lot. For example, the present disclosure is also applicable to automated valet parking in which a vehicle without an autonomous driving function is towed by an autonomous traveling robot. Also, the present disclosure is applicable to a case where the marker M is arranged in a town and a mobility such as a vehicle or a robot recognizes the marker M and performs localization process.

In the case of generalization, "vehicle" in the above description is replaced with "moving body".

What is claimed is:

1. A moving body support system for supporting a moving body that recognizes a marker arranged in a predetermined area, the moving body support system comprising:

a plurality of processors;

a management apparatus that communicates with the moving body, the management apparatus comprising a server having at least one processor of the plurality of processors, wherein the plurality of processors are configured to execute:

a brightness estimation process executed by the at least one processor of the plurality of processors and that estimates brightness at a position of the marker in the predetermined area without using an image captured by a camera mounted on the moving body;

a process that calculates a luminance correction value of an image including the marker according to the brightness at the position of the marker;

a process that acquires a first image including a target marker around the moving body by using the camera;

a process that generates a second image by correcting luminance of the first image by using the luminance correction value for the target marker; and a process that recognizes the target marker based on the second image.

2. The moving body support system according to claim 1, wherein the at least one processor of the plurality of processors is further configured to execute the process that calculates the luminance correction value.

3. The moving body support system according to claim 1, wherein the brightness estimation process includes:

a shadow position estimation process that estimates a position of a shadow in the predetermined area; and a process that estimates the brightness at the position of the marker based on marker position information indicating the position of the marker in the predetermined area and the position of the shadow.

4. The moving body support system according to claim 3, wherein the shadow position estimation process includes a first shadow position estimation process that estimates the position of the shadow created by an obstacle in the predetermined area.

5. The moving body support system according to claim 4, wherein the first shadow position estimation process includes:

a process that acquires light source position information indicating a position of a light source;

a process that acquires obstacle position information indicating a position of the obstacle; and a process that estimates, based on the light source position information and the obstacle position information, the position of the shadow created by the light source and the obstacle.

6. The moving body support system according to claim 5, wherein the obstacle includes at least one of another moving body in the predetermined area and a structure installed in the predetermined area.

7. The moving body support system according to claim 3, wherein the shadow position estimation process includes a second shadow position estimation process that estimates the position of the shadow created at least by the moving body.

8. The moving body support system according to claim 7, wherein the second shadow position estimation process includes:

a process that acquires light source position information indicating a position of a light source;

a process that acquires moving body size information indicating a size of the moving body; and a process that estimates the position of the shadow created by the moving body based on the light source position information and the moving body size information.

9. The moving body support system according to claim 5, wherein the light source position information includes:

sun position information indicating a position of a sun that varies according to an hour; and light position information indicating an installation position of a light present in the predetermined area.

10. The moving body support system according to claim 1, wherein the plurality of processors are further configured to:

acquire an image indicating a situation around the moving body by using the camera mounted on the moving body;

acquire marker position information indicating the position of the marker in the predetermined area; and acquire, as the first image, the image that is assumed to include the target marker around the moving body based on a position of the moving body and the marker position information.

11. The moving body support system according to claim 1, wherein the plurality of processors are further configured to:

acquire marker position information indicating the position of the marker in the predetermined area; and execute a moving body position estimation process that estimates a position of the moving body while correcting the position of the moving body based on a result of recognition of the target marker based on the second image and the marker position information.

12. The moving body support system according to claim 1, wherein the predetermined area is a parking lot, and the moving body supports automated valet parking in the parking lot.

13. The moving body support system according to claim 12, wherein the plurality of processors are further configured to:

acquire information of a scheduled entry time at which the moving body is scheduled to enter the parking lot; and estimate the brightness at the position of the marker in the predetermined area at the scheduled entry time in the brightness estimation process.

14. A moving body support method for supporting a moving body that recognizes a marker arranged in a predetermined area, the moving body support method comprising:

estimating, with at least one processor of a server, brightness at a position of the marker in the predetermined area without using an image captured by a camera mounted on the moving body;

calculating a luminance correction value of an image including the marker according to the brightness at the position of the marker;

acquiring a first image including a target marker around the moving body by using the camera;

generating a second image by correcting luminance of the first image by using the luminance correction value for the target marker; and recognizing the target marker based on the second image.

15. The moving body support system according to claim 1, wherein the management apparatus is configured to remotely operate the moving body.

* * * * *